United States Patent
Henry

(10) Patent No.: US 9,790,814 B2
(45) Date of Patent: Oct. 17, 2017

(54) MECHANICAL SYSTEM FOR A TURBINE ENGINE, TURBINE ENGINE, AND METHOD FOR ATTACHING A MECHANICAL SYSTEM WITHIN A TURBINE ENGINE

(71) Applicant: SNECMA, Paris (FR)

(72) Inventor: Philippe Paul Marie Henry, Le Mee S/Seine (FR)

(73) Assignee: SNECMA, Paris (FR)

( * ) Notice: Subject to any disclaimer, the term of this patent is extended or adjusted under 35 U.S.C. 154(b) by 497 days.

(21) Appl. No.: 14/360,377

(22) PCT Filed: Nov. 20, 2012

(86) PCT No.: PCT/FR2012/052676
§ 371 (c)(1),
(2) Date: May 23, 2014

(87) PCT Pub. No.: WO2013/076417
PCT Pub. Date: May 30, 2013

(65) Prior Publication Data
US 2014/0286770 A1    Sep. 25, 2014

(30) Foreign Application Priority Data
Nov. 23, 2011   (FR) ..................... 11 60692

(51) Int. Cl.
*F01D 25/28*   (2006.01)
*F01D 5/02*    (2006.01)
(Continued)

(52) U.S. Cl.
CPC ............. *F01D 25/28* (2013.01); *F01D 5/026* (2013.01); *F01D 5/066* (2013.01); *F01D 25/243* (2013.01);
(Continued)

(58) Field of Classification Search
CPC ....... F01D 25/28; F01D 25/243; F01D 25/265
See application file for complete search history.

(56) References Cited

U.S. PATENT DOCUMENTS 3,549,178 A * 12/1970 Flink .................... F16L 23/028
                                                   285/187
4,208,165 A *  6/1980 Wikstrom ............. F01D 25/265
                                                   415/138
(Continued)

FOREIGN PATENT DOCUMENTS

| EP | 1 096 111 | 5/2001 |
| EP | 1 158 142 | 11/2001 |
| EP | 1 683 942 | 7/2006 |

OTHER PUBLICATIONS

International Search Report Issued Jan. 31, 2013 in PCT/FR12/052676 Filed Nov. 20, 2012.
French Search Report Issued Oct. 18, 2012 in FR 1160692 Filed Nov. 23, 2011.

*Primary Examiner* — Gregory Anderson
*Assistant Examiner* — Cameron Corday
(74) *Attorney, Agent, or Firm* — Oblon, McClelland, Maier & Neustadt, L.L.P.

(57) ABSTRACT

A mechanical system for a turbomachine includes a turbomachine part to be attached and a plurality of threaded attachment elements mounted on the turbomachine part in sequence along a line. The attachment elements fix the turbomachine part to the turbomachine. At least some of the attachment elements are arranged to be prevented from rotating by mutual cooperation about their corresponding thread axes, by a rotation prevention system provided on each of these attachment elements called self-locking elements. The self-locked elements cooperate in pairs, each pair including two directly consecutive self-locked elements along the line. At least one of the pairs has a distance between the thread axes of its two self-locked elements less than the distance between one of these two thread axes and the axis of either of the two attachment elements arranged along the line on each side of the at least one of the pairs.

8 Claims, 3 Drawing Sheets

(51) Int. Cl.
*F01D 5/06* (2006.01)
*F01D 25/24* (2006.01)
*F01D 25/26* (2006.01)
*F02K 1/80* (2006.01)
*F02C 7/20* (2006.01)

(52) U.S. Cl.
CPC ......... *F01D 25/246* (2013.01); *F01D 25/265* (2013.01); *F02C 7/20* (2013.01); *F02K 1/80* (2013.01)

(56) References Cited

U.S. PATENT DOCUMENTS

| | | | | |
|---|---|---|---|---|
| 5,226,788 | A | * 7/1993 | Fledderjohn | F01D 5/066 411/84 |
| 5,295,773 | A | 3/1994 | Amoroso | |
| 6,273,675 | B1 | 8/2001 | Magoshi et al. | |
| 6,352,404 | B1 | * 3/2002 | Czachor | F01D 25/243 415/116 |
| 6,467,988 | B1 | * 10/2002 | Czachor | F01D 25/243 403/337 |
| 6,641,326 | B2 | * 11/2003 | Schilling | F16B 5/0275 403/337 |
| 2005/0172638 | A1 | * 8/2005 | Czachor | F01D 25/28 60/776 |
| 2008/0008589 | A1 | 1/2008 | Lee | |
| 2010/0316484 | A1 | * 12/2010 | Jasko | F01D 9/041 415/1 |

* cited by examiner

MECHANICAL SYSTEM FOR A TURBINE ENGINE, TURBINE ENGINE, AND METHOD FOR ATTACHING A MECHANICAL SYSTEM WITHIN A TURBINE ENGINE

TECHNICAL FIELD

The invention relates to the field of turbomachines and mechanical systems installed in them.

A mechanical part is usually attached using threaded attachment elements such as bolts, nuts or studs, during manufacturing of a turbomachine. The assembly formed by such a part to be attached on which attachment elements are mounted forms a mechanical system for a turbomachine.

More precisely, the invention relates to a mechanical system for a turbomachine, a turbomachine and an attachment process for a mechanical system in a turbomachine.

STATE OF PRIOR ART

Attachment of the mechanical system during production of a turbomachine must satisfy access, maintenance and safety constraints applicable to turbomachines.

Thus, due to the poor accessibility available in a turbomachine, the technician rarely has full access to all attachment elements to fix them in rotation and thus to perform the necessary screwing/unscrewing operations to fix the part to be fixed during attachment or disassembly steps of the part to be fixed in the turbomachine. This problem is exactly the same for maintenance operations for which the part to be fixed may have to be disassembled/reassembled and therefore screwing/unscrewing operations are necessary during which the technician needs to lock some attachment elements in rotation, for example such as bolts for which rotation has to be prevented so that nuts can be screwed onto the bolts.

It is known that this disadvantage can be overcome by providing a rotation prevention member on each attachment element to be locked, either added on or formed on the attachment element, so as to block it in rotation about its corresponding thread axes when these attachment elements to be locked are installed on the part to be fixed.

With this solution, a first possibility is to use a stop member on the attachment element as a locking member. Such a stop member is shaped to stop in contact with a corresponding stop wall formed on the part to be fixed. Thus, during attachment of the mechanical system on a turbomachine, each stop member stops in contact with a stop wall on the part to be fixed, and this prevents rotation of the corresponding attachment element.

When rotation of each attachment element to be locked is prevented, the technician can perform the necessary screwing operations to fix the part to be fixed without having to hold these attachment elements.

Nevertheless, preventing rotation of each attachment element in this way by the joint use of a stop member with a stop wall introduces stresses applied on the stop wall during screwing operations for attachment of the part to be fixed. These residual stresses after tightening can also cause crushing of the wall that can damage the part to be fixed after several assembly/disassembly operations of the part to be fixed. Furthermore, the formation of such a stop wall increases the weight of the part to be fixed and therefore of the turbomachine, reducing the efficiency of the turbomachine and increasing fabrication costs related to supply of the part to be fixed.

A second possibility using this solution is to adapt each locking member so that rotation of each attachment element is prevented by cooperation between the corresponding locking member with a directly adjacent attachment element. According to this possibility, the locking member has a bearing portion that bears in contact with the adjacent attachment element to be locked such that this bearing prevents rotation of the corresponding attachment element.

Thus, and in the same way as for the use of a stop member in contact on a stop wall of the part to be fixed, such a locking member enables attachment of the part to be fixed without the technician needing direct access to attachment elements to be locked so as to prevent their rotation.

Nevertheless, such a locking member must necessarily be adapted to the distance between the attachment elements to be locked. Attachment elements to be locked are usually uniformly distributed along a line, and as a result the accumulated length of locking members of all the attachment elements to be locked is of the same order of magnitude as the line. The result is a significant increase in the weight of the mechanical system and therefore the turbomachine. This increase in the weight of the mechanical system limits the efficiency of the turbomachine assembly and generates an increase in supply costs of attachment elements to be blocked.

PRESENTATION OF THE INVENTION

This invention is intended to overcome these disadvantages.

Therefore, one purpose of the invention is to provide a mechanical system in which attachment elements are prevented from rotating, the mechanical system having lower risks of residual stresses after tightening and damage to the part to be fixed during multiple assembly and disassembly operations, and in which an increase in the weight of the mechanical system for preventing the rotation of attachment elements is less than in mechanical systems according to prior art, in which attachment elements are prevented from rotating and that has lower risks of damage to the part to be fixed.

To achieve this, the purpose of the invention is a mechanical system for a turbomachine comprising a turbomachine part to be attached and a plurality of threaded attachment elements mounted on the part in sequence along a line, said attachment elements being adapted to fix the part to be fixed in the turbomachine, at least part of the attachment elements being arranged so as to be prevented from rotating by their mutual cooperation about their corresponding thread axes, by means of a rotation prevention system provided on each of these attachment elements called self-locked elements, said self-locked elements cooperating in pairs, each pair including two directly consecutive self-locked elements along the line, at least one of said pairs having a distance between the thread axes of its two self-locked elements less than the distance between either one of these two thread axes and the axis of any one of the axes of the two attachment elements arranged along the line on each side of said pair.

For self-locked elements, since the locking means are provided by cooperation only between self-locked elements of a single pair, the result is that locking means of said self-locked elements must cover only a portion of the line along which pairs are arranged without interaction with other attachment elements on this line. This thus reduces the mass of the assembly because the space between self-locked elements of each and the attachment elements on each side of the pair is not covered by the locking means.

Furthermore, since the distance between the thread axes of self-locked elements in at least one of the pairs is less than the distance between any one of these two thread axes and the axis of any one of the two attachment elements arranged on the line on each side of said pair, there is an additional reduction in the portion of the line covered by the locking means.

The distance between thread axes of the two self-locked elements of a pair may be strictly less than the distance between any one of these two thread axes and the thread axis of either of the two attachment elements arranged on the line on each side of said pair.

Thus, the means of locking all self-locked elements covers a reduced portion because the distance between the axes of the self-locked elements in a pair is less than the distance between the axes of either of the two attachment elements arranged on the line on each side of said pair.

The distance between the thread axes of the two self-locked elements in a pair may be approximately the same for each pair and is equal to a distance d1.

The same distance between the axes of self-locked elements of pairs makes it possible to use self-locked elements with similar locking means for each pair, thus limiting production costs of such self-locked elements.

All attachment elements may be self-locked elements, the distance between the thread axes of two consecutive self-locked elements in different pairs being equal to a distance d2 greater than d1, the ratio of d2 to d1 preferably being greater than or equal to 1.3.

The fact that only self-locked elements with a distance d2 between each pair are provided, this distance being more than d1, means that locking elements covering only the portion of line between self-locked elements in a single pair can be provided, the portion of the line between each pair not being covered. Since the distance d1 is less than d2, the result is that a portion of line longer than half the total length of the line is not covered.

Furthermore, if the ratio of d2 to d1 is less than 1.3, this portion of line not covered by the locking means represents about 60% of the total length of the line.

Each self-locked element may comprise a locking member forming the locking means, said locking member of a locking element in a pair being complementary to the locking member of the other self-locked element in the same pair, the locking member also preferably acting as an appropriate support means to limit translation displacements of the corresponding self-locked element along the thread axis of the self-locked element on the part to be fixed.

When such a locking member also acts as a stop means, the weight of the mechanical system can be reduced because attachment elements do not have to have another support means in addition to the locking member.

Each locking member may have a stop portion bearing on a complementary stop portion of the locking member corresponding to the other self-locked element in the pair, the stop portions of the self-locked elements preferably being approximately identical.

Such a stop portion can provide simple and robust locking for each self-locked element.

The line is approximately circular, the part to be fixed being preferably approximately in the form of a disk or approximately annular.

Each of the attachment elements may be an attachment element among the group comprising bolts, studs and nuts, the part to be fixed preferably being a turbomachine flange.

Such attachment elements can provide a simple and robust means of fastening the part to be fixed.

Furthermore, such attachment means are particularly suitable for a part to be fixed if it is a flange.

The invention also relates to a turbomachine comprising a mechanical system according to the invention.

Such a turbomachine has easy maintenance because the mechanical system used on it can be disassembled without requiring locking of self-locked elements, while having little additional weight compared with a turbomachine equipped with a mechanical system according to prior art with means of preventing rotation of its attachment elements.

The invention also relates to a turbomachine fabrication method, the turbomachine comprising a mechanical system according to the invention, the method including steps consisting of:
 providing a mechanical system according to the invention,
 fixing the part to be fixed by means of the attachment elements.

Such a method enables fabrication of a turbomachine with easy maintenance because the mechanical system installed on it can be disassembled without the need to lock self-locked elements, while having a small increase in weight in comparison with a turbomachine fitted with a mechanical system according to prior art with means of preventing rotation of its attachment elements.

BRIEF DESCRIPTION OF THE DRAWINGS

This invention will be better understood after reading the description of example embodiments given purely for guidance and in no way limitative, with reference to the appended drawings in which.

Identical, similar or equivalent parts of the different figures have the same numeric references to facilitate the comparison between one figure and the others.

The different possibilities (variants and embodiments) must be understood as not being mutually exclusive and they can be combined with each other.

DETAILED PRESENTATION OF PARTICULAR EMBODIMENTS

Figure 1:
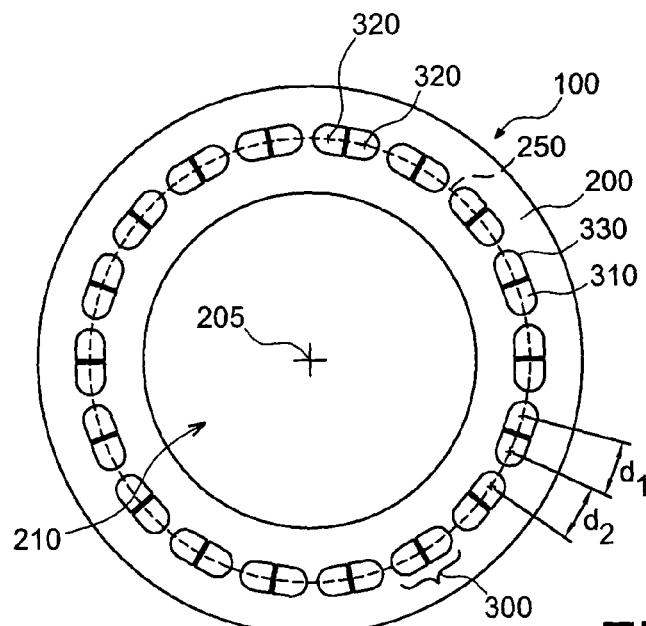
FIG. 1 shows an example of a mechanical system according to the invention.

FIG. 1 shows a mechanical system 100 designed to be installed on a turbomachine.

Figure 2:
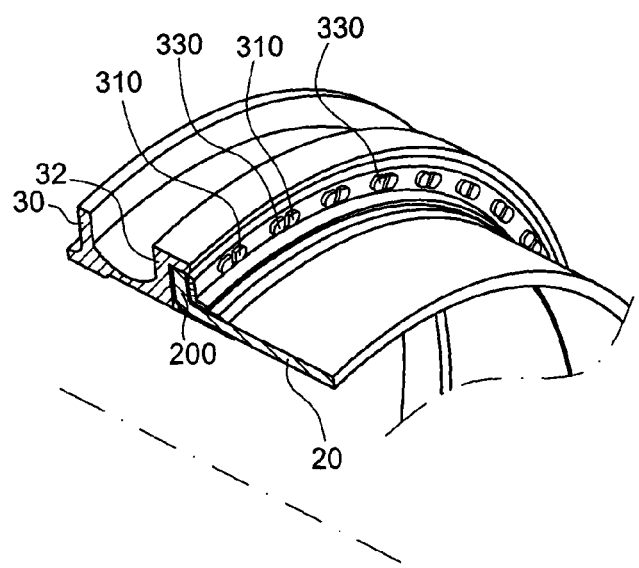
FIG. 2 shows two portions of casings fixed to each other by means of a mechanical system of the same type as that shown in FIG. 1.

The mechanical system 100 shown is a flange, such as a connecting flange 200 used to connect two portions 20, 30 of combustion gas exhaust casings as shown in FIG. 2.

Figure 3:
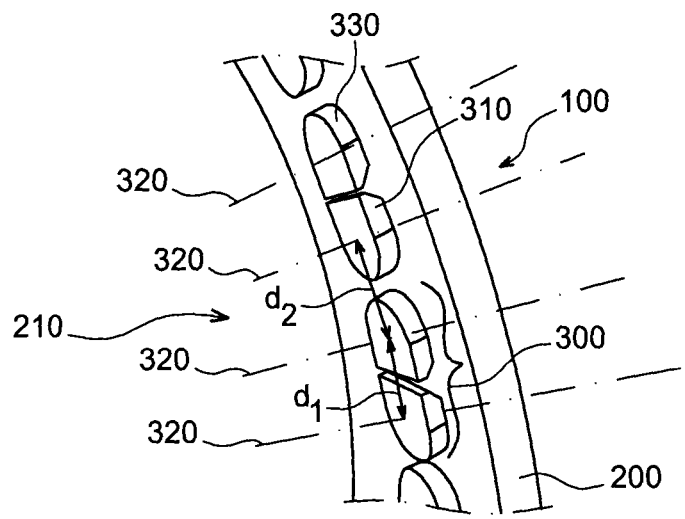
FIG. 3 shows a close-up perspective view of the mechanical system shown in FIG. 1.

Such a mechanical system 100 comprises:
 a first flange 200 that will be used with a second flange 32 shown only in FIG. 2 to connect two portions of casings 20, 30, and
 a plurality of bolts 310, 330 that is intended to attach the first flange 200 onto the second flange when the first and second flange 200 make the connection between two casings, each of the bolts 310, 330 having a threaded bolt body 311 as shown in FIG. 3, defining a thread axis 320 and a bolt head 315 acting as means of preventing rotation.

The flange 200 has a plane annular shape, the central opening 210 of the ring being adapted for the passage of a rotor and centred onto an axis 205 corresponding to the longitudinal axis of the turbomachine.

The flange 200 comprises a plurality of through holes not shown, for bolts distributed along a line 250. The line 250, as shown in dashed lines in FIG. 1, is approximately circular. The line 250 follows a circumference of the flange 200, like a conventional through hole, preferably with a small clearance.

The through holes are adapted for the passage of bolts 310, 330. Each through hole is preferably smooth to facilitate assembly of bolts 310, 330 on the flange 200.

The through holes are arranged approximately uniformly in pairs.

The through holes on the flange 200 are arranged such that when the bolts 310, 330 are mounted on the first flange 200, the distance between the thread axes 320 of the two bolts 310, 330 corresponding to one pair 300 is approximately equal to d1 and such that the distance between the axes of the two bolts 310, 330 adjacent to each other along the line 250 and belonging to two different pairs is equal to approximately d2.

The distances d1 and d2 are defined taking account of two parameters, namely the mechanical stresses necessary to obtain a high quality connection between the two casings and the dimensions and therefore the weight of the bolt heads 315 of the bolts 310, 330.

Thus, the first parameter is used to determine d2, that will be chosen such that compression forces of the first flange and the second flange are distributed uniformly around their periphery.

The second parameter is used to determine d1, that defines the dimensions of bolt heads 315 for high quality prevention of bolt rotation without the bolts being excessively heavy.

The ratio d2 to d1 may be greater than 1.3.

Figure 4:
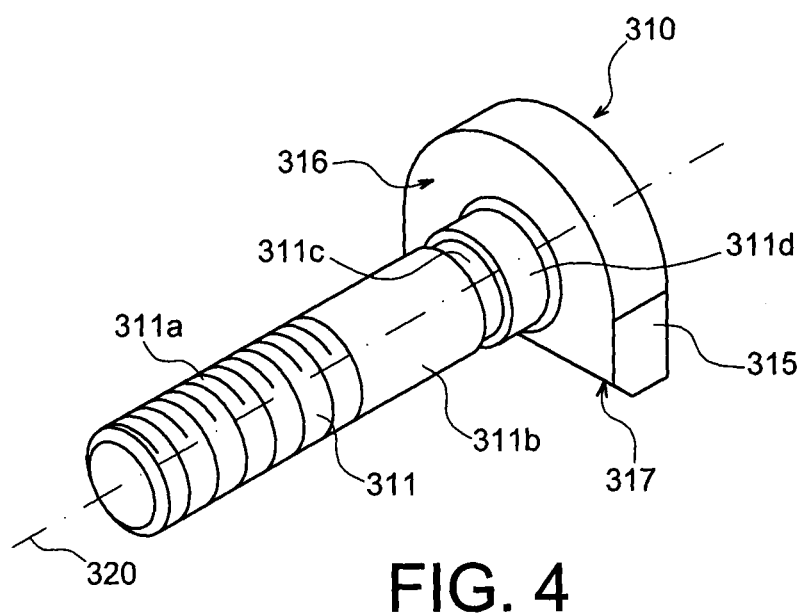
FIG. 4 shows a first variant of an attachment element in which the attachment element is a bolt.

FIG. 4 shows one of the bolts.

The body of bolt 311 is axially symmetric about the thread axis 320. The body of bolt 311 comprises a threaded part 311a for assembly of a nut and a smooth part 311b for assembly in the corresponding through hole of the first flange 200 and of the second flange.

The smooth part 311b comprises a groove 311c around its periphery adapted to hold a stop ring (not shown) and a part 311d adjusted to the through hole corresponding to the first flange 200 so as to fix the bolt to the first flange 200 before assembly on the second flange.

The bolt head 315 is approximately plane in shape with a bearing face 316 bearing in contact with the first flange 200 when the bolt 310, 330 is installed on the first flange 200. The bolt head 315 is arranged at the end of the adjusted part 311d of the smooth part, the body of bolt 311 extending approximately perpendicular to the bearing face 316. The body of bolt 311 is connected to the centre of the bearing face 316 so that connection loads can be satisfactorily distributed.

The bearing face 316 forms a bearing means appropriate to bear on the first flange 200 when the bolt 310, 330 is installed in the first flange 200, and thus limit translation displacements of the bolt 310, 330 along its thread axis 320 relative to the first flange 200.

The bolt head 315 comprises a stop portion 317 adapted to bear in contact with the portion of the stop 317 of a second bolt 330 that is matched to it when it is installed on the first flange 200.

The stop portion 317 is an approximately plane portion of the bolt head 315 parallel to the thread axis 320 of the bolt 310. The distance between the plane delimited by the stop portion 317 and the centre of the bearing face 316 at the intersection with the thread axis 320 is equal to half d1 minus half the separation distance between bolts 310, 330, this spacing being much less than d1.

For example, the separation distance between bolts 310, 330 may be equal to 0.5 mm.

The bolt head 315, due to its bearing portion 317, is a bolt stop member and forms a rotation prevention means when the bolt 310 is installed on the flange 200 and cooperates with a bolt 330 matched to it.

Each of the bolts 310, 330 forms an attachment element that is also a self-locked element due to the presence of the stop portion 317.

The first flange 200 and the plurality of bolts 310, 330 associated with it form a mechanical system for a turbomachine when the bolts 310, 330 are installed in the corresponding through holes.

Such a mechanical system 100 is suitable for fabrication of a turbomachine.

The second flange has a shape similar to the first flange with through holes corresponding to those in the first flange 200 such that when the first flange 200 is fixed onto the second flange, each of the through holes in the first flange 200 is facing the corresponding through hole in the second flange.

Thus, a turbomachine comprising such a mechanical system 100 may be fabricated using a method including particularly steps consisting of:

provide the first casing fitted with the first flange 200,
provide the plurality of bolts 310, 330,
install the bolts 310, 330 each in the corresponding through hole of the first flange 200, the bolts 310, 330 being matched in pairs 300 with their bearing face 316 bearing on the first flange 200 and the stop portion 317 facing the stop portion 317 of the bolt 330 matched to it,
install a stop ring in the groove 311c of each bolt 310, 330 in order to fix them with the first flange.
provide the second casing fitted with the second flange,
insert the threaded parts 311a of the bolts 310, 330 into the corresponding bolt through holes in the second flange so as to attach the casings together with communication between them, the two flanges 200 squeezing the two casings in contact with each other,
provide nuts, not shown, with dimensions compatible with the dimensions of the bolts 310, 330,
screw the nuts on the bolts 310, 330 so as to make the junction between the two casings fixed and relatively leaktight.

Thus, when these steps are implemented using a mechanical system 100 as disclosed above, the technician performing these implementations does not need to prevent rotation of the bolts 310, 330, since they are locked in rotation by bearing of their stop portion 317 on the stop portion 317 of the bolt 330 matched to them.

Figure 5:
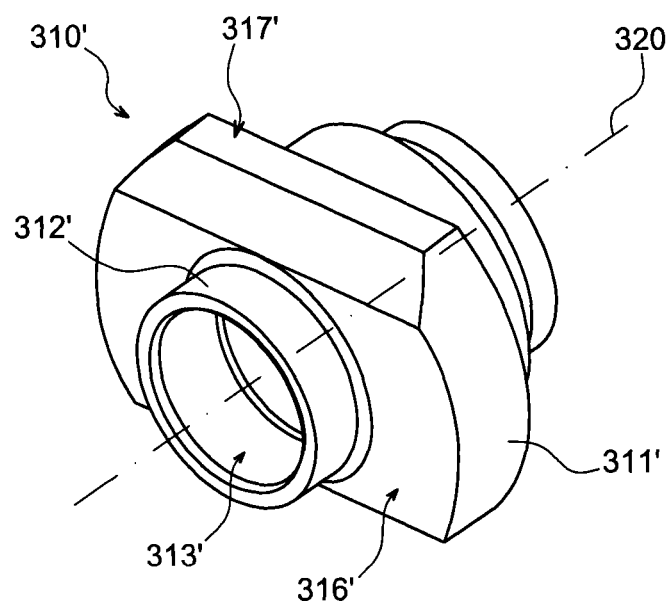
FIG. 5 shows a second variant of an attachment element in which the attachment element is a nut.

FIG. 5 shows a variant of the mechanical system 100 according to which the attachment elements are bolts 310'.

Such a mechanical system is different from the mechanical system 100 described above in that each of the through holes is a through hole for a bolt, not shown, of the second flange that will be screwed into the corresponding nut 310' in the mechanical system 100, and in that the nut 310' comprises a nut body 311', this nut body 311' having the stop portion 317'.

A nut 310' according to this variant comprises a threaded hole 313' formed in the nut body 311' and that will hold the threaded part of a bolt, not shown, during attachment of the first flange 200 onto the second flange. The nut 310' also comprises a central assembly part 312' in which the threaded hole is also formed.

This central part 312' may also comprise a self-locked or equivalent zone adapted to prevent accidental loosening of the bolt during operation, particularly in the presence of strong vibrations.

The central part 312' projecting from the nut body 311' will be installed in the corresponding through hole in the first flange 200 to enable assembly of the nut 310' on the first flange 200.

The central part 312' is adapted so that it can be locked in the through hole of the first flange when it is inserted into the hole. Such an adaptation of the central part may be in the form of a taper of this central part that will cooperate with a larger or conical reaming formed in the first flange 200 on the face opposite the face on which the surface 316' of the nut will bear in contact.

A turbomachine comprising a mechanical system 100 according to this variant may be fabricated using a method particularly including steps to:
provide the first casing fitted with the first flange 200,
provide the plurality of nuts 310',
install each of the nuts 310' in the corresponding through hole in the first flange 200, the nuts 310' being associated in pairs 300 with their bearing face 316' bearing on the first flange 200 and the stop portion 317' bearing on the stop portion of the nut matched with it, the central part 312' being installed in the corresponding through hole,
provide the second casing fitted with the second flange,
position the second flange so as to join the casings with a communication between them, the two flanges 200 squeezing the casings in contact with each other, this positioning being arranged such that the through holes of the second flange are coincident with the through holes in the first flange 200,
provide bolts with dimensions compatible with the dimensions of nuts 310',
insert the bolts in the through holes in the second flange and screw the bolts in the corresponding nuts 310' so as to make the junction between the two casings fixed and relatively leaktight.

Although the attachment elements in the two variants described above are bolts 310, 330 and nuts 310' respectively, the attachment elements may also be studs, the central part of the stud forming a bearing member comprising a stop portion 317 forming a locking means, without going outside the scope of the invention.

Similarly, without going outside the scope of the invention, different types of attachment elements can be associated with each other on a single flange 200. Thus, it would be possible to match a bolt and a stud on each pair 300, the stop portions 317, 317' of each type of attachment element being adapted to cooperate with the stop portion of an element of the other type.

Similarly, although the stop portion 317 is plane in shape and is identical for each self-locked element, without going outside the scope of the invention, it would also be possible to envisage self-locked elements of a first type with a stop portion 317, 317' of a first shape, such as a curved surface, and self-locked elements of a second type with a stop portion 317 of a second shape complementary to the first shape, the self-locked elements of the first type in each pair 300 being associated with an element of the second type when the elements are fitted on the part to be fixed.

Similarly, although the part to be fixed in the embodiment disclosed above is a flange and the line 250 is a circular line, the part to be fixed may be in a shape other than a ring, such as a linear shape, and may be another part to be fixed in a turbomachine, such as a rail, without going outside the scope of the invention. According to this possibility, the line would also have an appropriate shape, such as a straight line, for a linear part to be fixed.

The invention claimed is:

1. A mechanical system for a turbomachine, comprising:
a turbomachine part to be attached; and
a plurality of threaded attachment elements mounted on the turbomachine part to be attached in sequence along a line, wherein
the threaded attachment elements are adapted to fix the turbomachine part to be attached in the turbomachine and each of the threaded attachment elements having a thread axis,
all of the threaded attachment elements, called self-locking threaded attachment elements, are arranged so as to be prevented from rotating by mutual cooperation about corresponding thread axes thereof, by means of a rotation prevention system provided on each of the self-locking threaded attachment elements,
the self-locking threaded attachment elements cooperate in pairs, each pair including two directly consecutive self-locking threaded attachment elements along the line, and
for each of the pairs, a distance between the thread axes of the two self-locking threaded attachment elements of the pair is less than distances between the thread axis of each of the two self-locking threaded attachment elements of the pair and the thread axes of the two attachment elements directly consecutive to the pair along the line,
the distance between the thread axes of the two self-locking threaded attachment elements in a pair is approximately the same for each pair and is equal to a distance d1, and
the distance between the thread axes of two consecutive self-locking threaded attachment elements in different pairs being equal to a distance d2 greater than the distance d1.

2. The mechanical system according to claim 1, wherein each self-locking threaded attachment element comprises a locking member forming locking means, the locking member of one of the self-locking threaded attachment element in a pair being complementary to the locking member of the other self-locking threaded attachment element in the same pair, the locking member also acting as a support means to limit translation displacements of the corresponding self-locking threaded attachment element along the thread axis of the self-locking threaded attachment element on the turbomachine part to be fixed.

3. The mechanical system according to claim 2, wherein each locking member has a stop portion bearing on a stop portion complementary to the locking member corresponding to the other self-locking threaded attachment element in the pair, the stop portions of the self-locking threaded attachment elements being approximately identical.

4. The mechanical system according to claim 1, wherein the line is approximately circular, the turbomachine part to be fixed being approximately in the form of a disk or approximately annular.

5. The mechanical system according to claim 1, wherein each of the attachment threaded elements is a threaded attachment element among the group comprising bolts, studs and nuts, the turbomachine part to be fixed being a turbomachine flange.

6. A turbomachine, comprising:
   the mechanical system according to claim 1.

7. A turbomachine fabrication method, the method comprising:
   providing the mechanical system according to claim 1; and
   fixing a turbomachine part by means of the attachment elements.

8. The mechanical system according to claim 1, wherein the ratio of d2 to d1 is greater than or equal to 1.3.

\* \* \* \* \*